(12) United States Patent
Aoki (10) Patent No.: US 9,975,587 B2
(45) Date of Patent: May 22, 2018

(54) RESISTANCE REDUCTION MEMBER

(71) Applicant: HONDA MOTOR CO., LTD., Tokyo (JP)

(72) Inventor: Takamasa Aoki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days. days.

(21) Appl. No.: 15/238,147

(22) Filed: Aug. 16, 2016

(65) Prior Publication Data

US 2017/0057567 A1    Mar. 2, 2017

(30) Foreign Application Priority Data

Aug. 25, 2015    (JP) ................................. 2015-166154

(51) Int. Cl.
*B62D 35/02*    (2006.01)
*B62D 37/02*    (2006.01)

(52) U.S. Cl.
CPC ............. *B62D 37/02* (2013.01); *B62D 35/02* (2013.01); *Y02T 10/88* (2013.01)

(58) Field of Classification Search
CPC ................................. B62D 35/02; B62D 37/02
See application file for complete search history.

(56) References Cited

U.S. PATENT DOCUMENTS

| 6,070,933 | A  | * | 6/2000  | Tsukidate | ............. | B62D 35/005 |
|           |    |   |         |           |               | 180/68.1    |
| 9,327,779 | B1 | * | 5/2016  | Wey       | ..................... | B62D 35/001 |
| 2012/0061993 | A1 | * | 3/2012  | Hasegawa  | .............. | B62D 25/16  |
|           |    |   |         |           |               | 296/181.5   |
| 2013/0026790 | A1 | * | 1/2013  | Kakiuchi  | ............... | B62D 35/02  |
|           |    |   |         |           |               | 296/193.07  |
| 2015/0210324 | A1 | * | 7/2015  | Kojima    | ................ | B62D 35/005 |
|           |    |   |         |           |               | 296/180.1   |
| 2015/0266552 | A1 | * | 9/2015  | McAlister | ................. | B63B 5/06   |
|           |    |   |         |           |               | 29/525.02   |
| 2016/0214662 | A1 | * | 7/2016  | Emura     | .................... | B62D 25/16  |
| 2016/0339970 | A1 | * | 11/2016 | Shibutake | ............ | B62D 35/005 |
| 2017/0036710 | A1 | * | 2/2017  | Weiss     | ..................... | B62D 37/02  |
| 2017/0057567 | A1 | * | 3/2017  | Aoki      | ..................... | B62D 35/02  |

FOREIGN PATENT DOCUMENTS

| JP | 2009-202795 A | 9/2009 |
| JP | 2012-101698 A | 5/2012 |
| JP | 2014-076705 A | 5/2014 |

OTHER PUBLICATIONS

Office Action dated Apr. 7, 2017, issued in counterpart Japanese Patent Application No. 2015-166154, with English translation. (6 pages).
Japanese Office Action dated Jun. 27, 2017, issued in Japanese Patent Application No. JP 2015-166154, with English translation. (4 pages).

* cited by examiner

*Primary Examiner* — Gregory A Blankenship
(74) *Attorney, Agent, or Firm* — Westerman, Hattori, Daniels & Adrian, LLP

(57) ABSTRACT

The resistance reduction member includes: an attachment portion attached to a lower surface of a vehicle body; a main body surface extending downward from the attachment portion; and a reinforcement portion extending downward from the side of the lower surface of the vehicle body, on a lateral surface of the main body surface on the vehicle rear side, and configured to prevent toppling of the main body surface.

6 Claims, 7 Drawing Sheets

RESISTANCE REDUCTION MEMBER

CROSS-REFERENCE OF RELATED APPLICATION

This application claims priority of Japanese Patent Application No. 2015-166154 filed in Japan on Aug. 25, 2015, the entire contents of which are incorporated herein by reference.

TECHNICAL FIELD

The present invention relates to a resistance reduction member.

BACKGROUND OF THE INVENTION

There are vehicles provided with tire spats (resistance reduction member), which reduce the air resistance on wheels even during high-speed travel to improve fuel economy and aerodynamic performance.

Figure 7A:
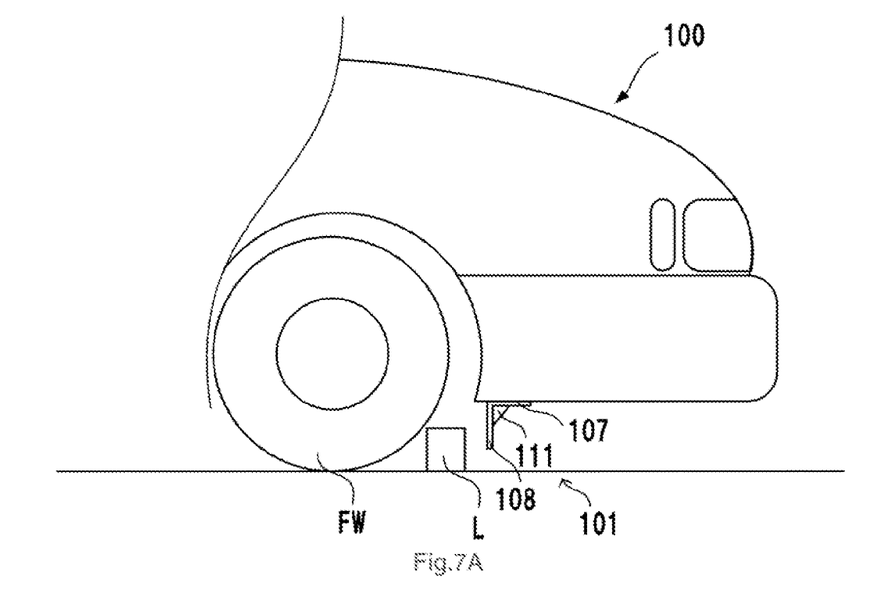
FIG. 7(A) is an explanatory drawing showing a state where it has overridden a lock.

For example, Japanese Patent Application Publication No. 2009-202795 describes a technique of attaching a reinforcement member for preventing deformation due to traveling air, on a tire spat enlarged to improve aerodynamic performance. Part (A) of FIG. 7 shows a tire spat 101 including such a reinforcement member. The tire spat 101 is attached to a lower surface of the vehicle body in front of a front wheel FW, with an attachment plate 107. The tire spat reduces the air resistance on the wheel FW, by receiving traveling air on a plate-shaped wind receiving plate 108 extending vertically downward from the attachment plate 107, and preventing traveling air from hitting the wheel FW. Also, in the tire spat 101, a support plate 111, which is formed into a right angled triangle in side view, connects a surface of the wind receiving plate 108 on the vehicle front side and the attachment plate 107, to reinforce the tire spat 101 to keep it from being toppled toward the vehicle rear by wind pressure applied thereon during high-speed travel of the vehicle. Note that multiple support plates 111 are arranged on the wind receiving plate 108, at predetermined intervals in the vehicle width direction.

As shown in part (A) of FIG. 7, when a vehicle 100 is parked from the front, the enlarged tire spat 101 may interfere with or override a lock L provided in a parking area. Part (A) of FIG. 7 shows a state where the tire spat 101 has overridden the lock L. When the tire spat 101 overrides the lock L, the lock L applies a force pushing from front to rear on the wind receiving plate 108, relative to the movement of the vehicle. At this time, a pulling force acts on the support plate 111 fixed to the wind receiving plate 108, whereby damage such as a crack may occur in the support plate 111 and peripheral parts thereof.

Figure 7B:
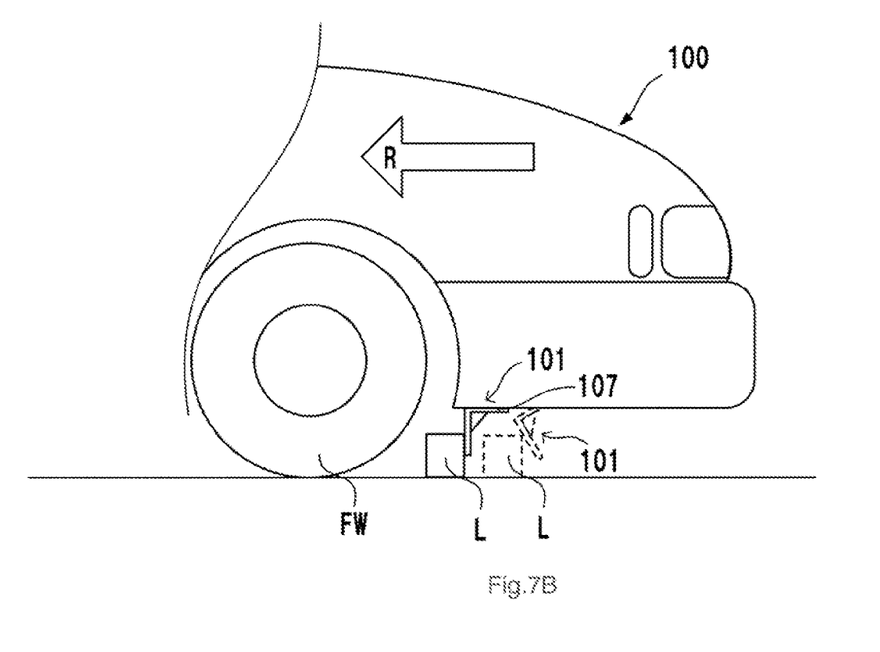
FIG. 7(B) is an explanatory drawing showing how it is drawn out of the lock.

Also, as shown in part (B) of FIG. 7, when moving the vehicle 100 rearward (arrow R direction) and out of the parking area, the lock L abuts on the vehicle rear side of the wind receiving plate 108, and a load inverted from that at the time of parking is applied on the wind receiving plate 108. Since the reinforcing support plate 111 is provided on the surface of the wind receiving plate 108 on the vehicle front side, warpage of a lower end part of the wind receiving plate 108 toward the vehicle front may be inhibited by the attachment plate 107. If the vehicle is moved rearward in this state, force concentrates in the attachment plate 107, and the lock L may pull the tire spat 101 apart from the vehicle body, as indicated by a broken line in part (B) of FIG. 7.

SUMMARY OF THE INVENTION

Accordingly, an objective of the present invention is to provide a resistance reduction member that prevents deformation due to traveling air, and also prevents damage when the member overrides or is drawn out of a lock.

According to the present invention, there is provided a resistance reduction member including: an attachment portion attached to a lower surface of a vehicle body; a main body surface extending downward from the attachment portion; and a reinforcement portion extending downward from the side of the lower surface of the vehicle body, on a lateral surface of the main body surface on the vehicle rear side, and configured to prevent toppling of the main body surface.

According to the present invention, it is possible to provide a resistance reduction member that prevents deformation due to traveling air, and also prevents damage caused by overriding or drawing out of a lock.

BRIEF DESCRIPTION OF THE DRAWINGS

According to a first embodiment of the present invention.

Of the resistance reduction member attached to the vehicle body.

Of the resistance reduction member.

Of the resistance reduction member.

Of a conventional tire spat.

DETAILED DESCRIPTION OF THE INVENTION

<First Embodiment>
<Resistance Reduction Member 1>

Figure 1A:
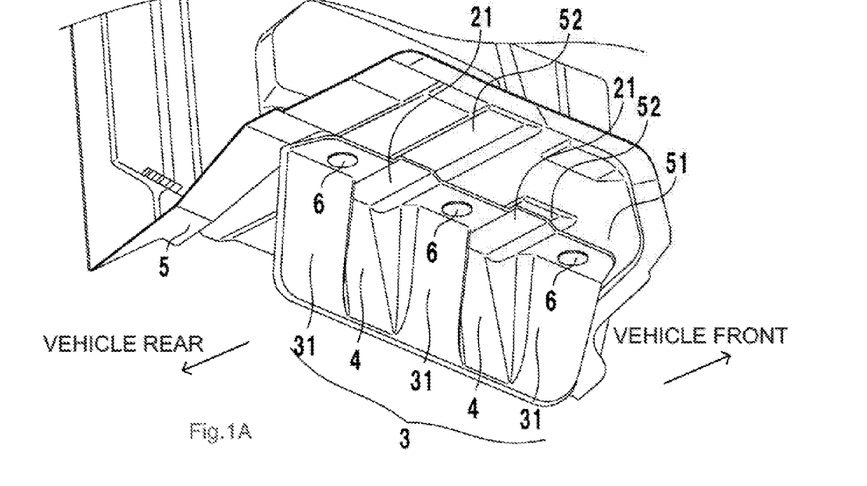
FIG. 1(A) is a perspective view of a resistance reduction member when attached to a vehicle body, as viewed from the front obliquely lower direction.
Figure 1B:
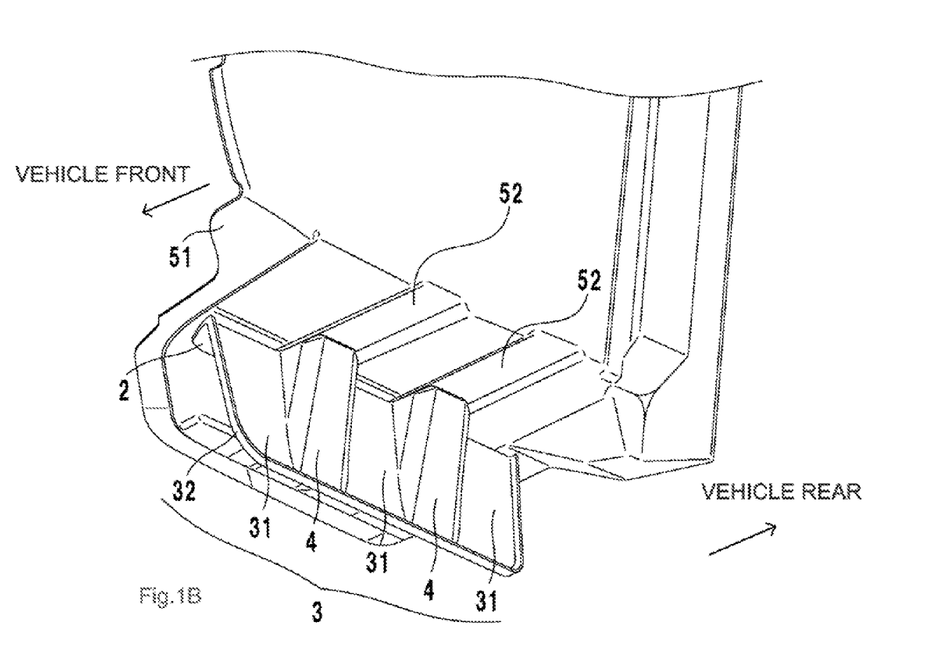
FIG. 1(B) is a perspective view of the resistance reduction member when attached to the vehicle body, as viewed from the rear obliquely lower direction.
Figure 2A:
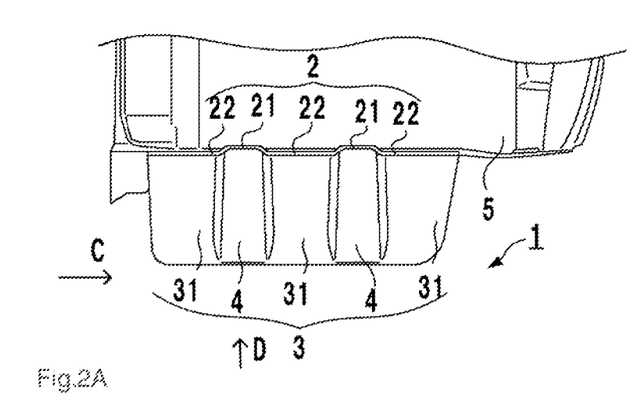
FIG. 2(A) is a side view as viewed from the vehicle front.
Figure 2B:
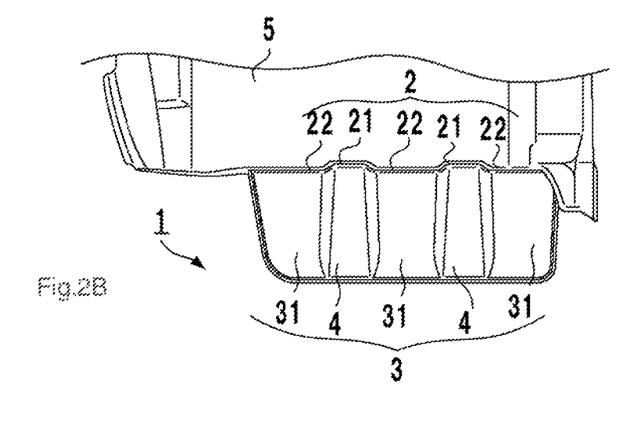
FIG. 2(B) is a side view as viewed from the vehicle rear.
Figure 2C:
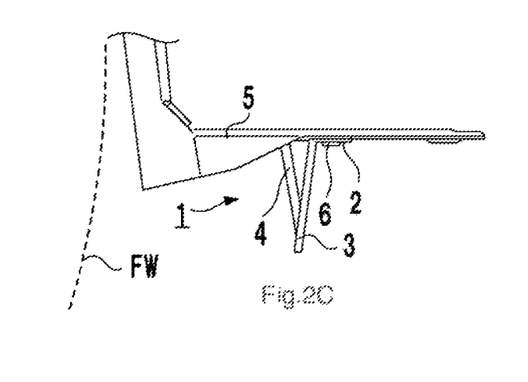
FIG. 2(C) is a side view on arrow C of FIG. 2(A)
Figure 2D:
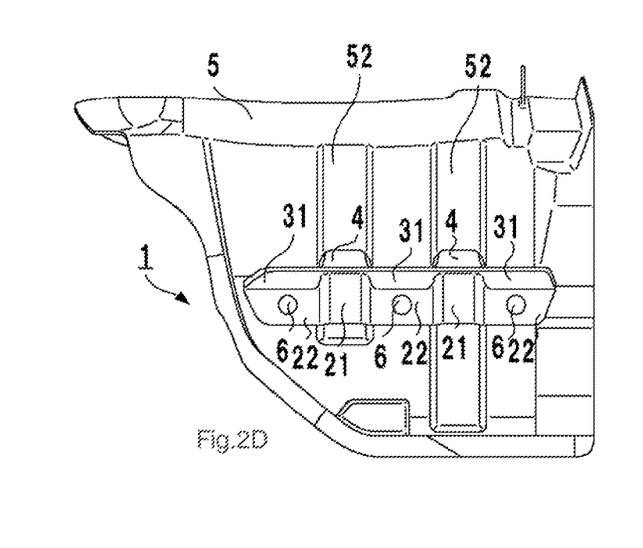
FIG. 2(D) is a plan view on arrow D of FIG. 2(A).
Figure 3A:
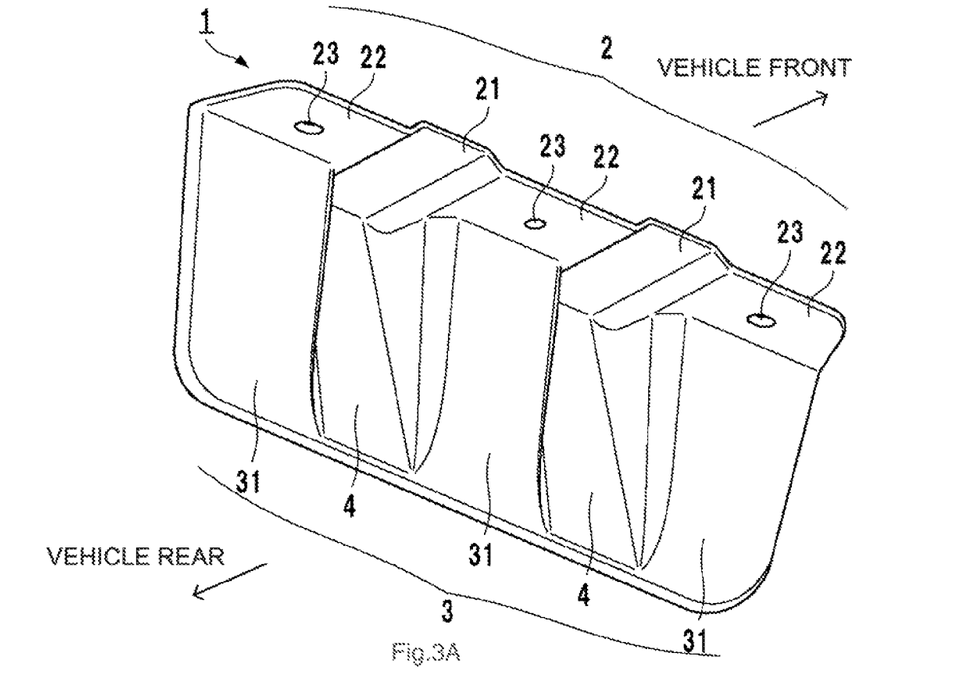
FIG. 3(A) is a perspective view as viewed from the vehicle front.
Figure 3B:
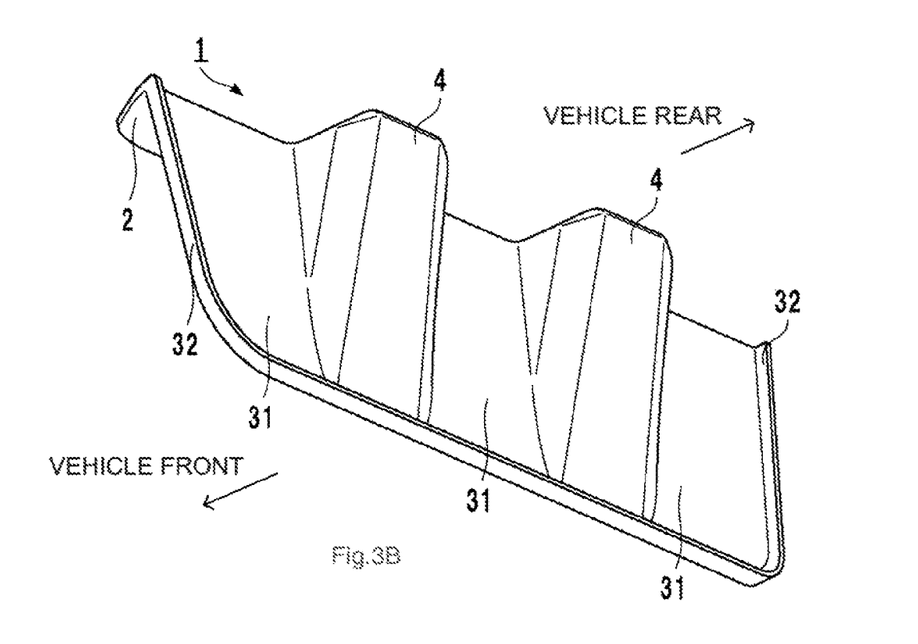
FIG. 3(B) is a perspective view as viewed from the vehicle rear.

FIGS. 1 and 3 are perspective views of a resistance reduction member 1 of a first embodiment of the present invention. Part (A) of FIG. 1 is a perspective view of the resistance reduction member 1 when attached to a vehicle body, as viewed from the vehicle front. Part (B) of FIG. 1 is a perspective view of the resistance reduction member 1 when attached to the vehicle body, as viewed from the vehicle rear. Part (A) of FIG. 3 is a perspective view of the resistance reduction member 1 as viewed from the vehicle front. Part (B) of FIG. 3 is a perspective view of the resistance reduction member 1 as viewed from the vehicle rear. Also, FIGS. 2 and 4 respectively show plan views and side views of the resistance reduction member 1 when attached to the vehicle body, and of the resistance reduction member 1 alone. In the following description, upper and lower, and right and left directions of the drawings will be used as the upper and lower, and right and left directions of the resistance reduction member 1.

The resistance reduction member 1 shown in FIG. 1 is attached to an under cover 5 (lower surface of vehicle body) in front of a front wheel FW, for example, and reduces the air resistance on the front wheel FW by preventing traveling air from hitting the wheel. Note that although the resistance reduction member 1 arranged in front of the front wheel FW is used as an example in the embodiment, the invention is not limited to this. For example, the resistance reduction member may be attached to a lower surface of the vehicle body in front of a rear wheel. As indicated by arrows in part (A) of FIG. 1 and part (A) of FIG. 3, the right obliquely upper direction of the resistance reduction member 1 indicates the vehicle front, and the left obliquely upper direction thereof indicates the vehicle rear. Also, as indicated by arrows in part (B) of FIG. 1 and part (B) of FIG. 3, the right obliquely upper direction of the resistance reduction member 1 indicates the vehicle rear, and the left obliquely upper direction thereof indicates the vehicle front.

The resistance reduction member 1 includes an attachment portion 2 attached to the under cover 5, a main body surface 3 extending vertically downward from the attachment portion 2, and reinforcement portions 4 extending downward (from upper to lower sides in FIG. 1) from an upper position immediately underneath the lower surface of the vehicle body and adjacent to the attachment portion 2, in a manner that protrudes from and along the vehicle rear side of the main body surface 3, and configured to prevent toppling of the main body surface 3 (see parts (A) and (B) of FIG. 2). Although an integrally formed part made of resin or other materials can be used as an example of the resistance reduction member 1, the invention is not limited to this, and the part may be manufactured by pressing a metal plate, for example.

<Attachment Portion 2>

The attachment portion 2 is fixed to the under cover 5, to thereby fix the resistance reduction member 1 to the lower surface of the vehicle body. Also, the attachment portion 2 is attached to a predetermined position on the lower surface of the vehicle body, in front of the front wheel FW (see part (C) of FIG. 2). As shown in parts (A) and (B) of FIG. 1, a reinforcement bead is formed in the under cover 5. The reinforcement bead includes multiple (two in the embodiment) elongated protrusions 52 protruding toward the inner side of the vehicle, from a lower surface 51 of the under cover 5. Note that although the attachment portion 2 of the embodiment includes protrusions 21 following the shapes of the elongated protrusions 52 of the reinforcement bead, and has a strengthened form as an example (see part (D) of FIG. 2), the attachment portion 2 does not necessarily have to include the protrusions 21.

Figure 4A:
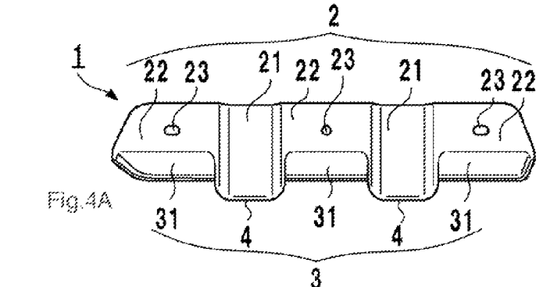
FIG. 4(A) is a plan view on arrow A of part (B)
Figure 4B:
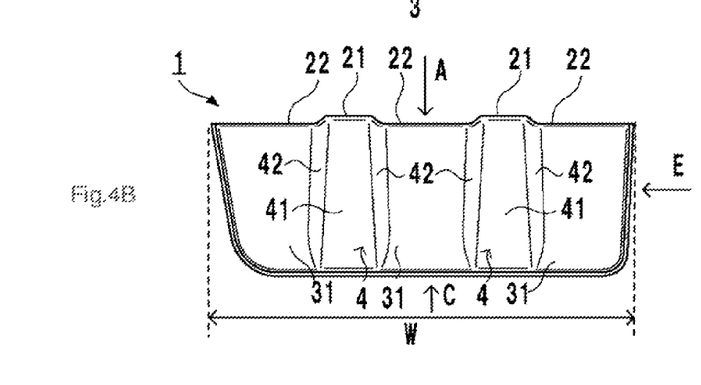
FIG. 4(B) is a side view when attached to the vehicle body, as viewed from the vehicle rear.
Figure 4C:
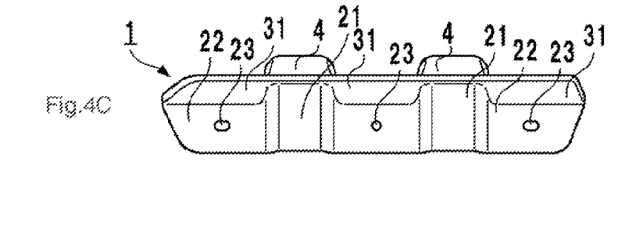
FIG. 4(C) is a plan view on arrow C of part (B)
Figures 4D, 4E:
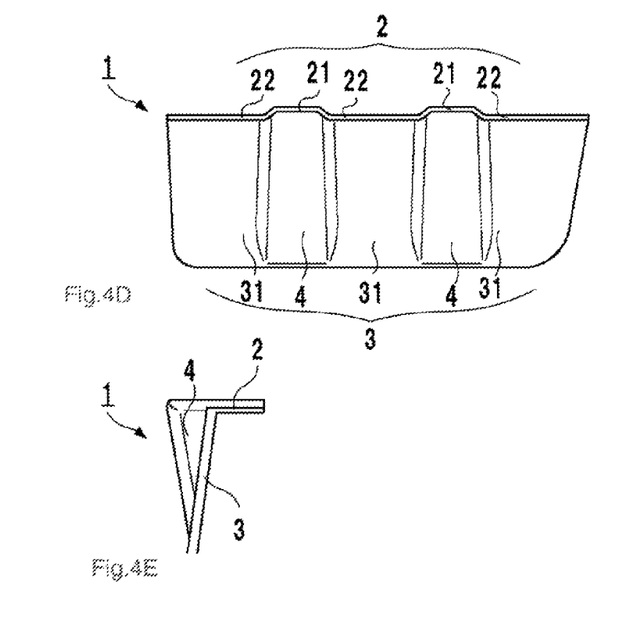
FIG. 4(D) is a side view as viewed from the vehicle front.
FIG. 4(E) is a side view on arrow E of part (B).

The protrusion 21 has an outer shape corresponding to the shape of the elongated protrusion 52, so that it fits into the elongated protrusion 52 when the attachment portion 2 is attached to the lower surface 51 of the under cover 5. Thus, the protrusion 21 increases stiffness of the resistance reduction member 1. Also, since the protrusion 21 fits into the elongated protrusion 52 to allow mutual reinforcement of the under cover 5 and the resistance reduction member 1, deformation of the resistance reduction member 1 can be suppressed. In the embodiment, both of the elongated protrusion 52 and protrusion 21 have a trapezoidal shape from which the lower base is eliminated, in cross-sectional view (see part (D) of FIG. 4). Additionally, as shown in FIG. 3, the attachment portion 2 includes flat portions 22 adjacent to the protrusions 21, and is formed into a bead shape by connecting trapezoid legs of multiple protrusions 21 with the adjacent flat portions 22.

In addition, the flat portion 22 has locking portions 23 for locking the attachment portion 2 onto the under cover 5 (lower surface of vehicle body). Since the attachment portion 2 of the embodiment is attached to the under cover 5 through a fastener 6, the locking portion 23 is formed into a circular or oblong hole into which the faster 6 can be inserted (see parts (A) and (C) of FIG. 4). Note that although the locking portion 23 of the embodiment is formed in the flat portion 22, it may be formed in the protrusion 21. Moreover, the method of fixing the attachment portion 2 to the under cover 5 is not limited to the fastener 6, and known fixing methods such as screwing, riveting, adhesion, and welding may be used. Further, when using adhesion or similar methods as the fixing method, the attachment portion 2 may be used as an adhesive surface, instead of forming a hole in the locking portion 23.

<Main Body Surface 3, Reinforcement Portion 4>

The main body surface 3 extends downward from the under cover 5, on an end part of the attachment portion 2 on the vehicle rear side. As shown in part (B) of FIG. 4, a width W in the vehicle width direction of the main body surface 3 is substantially the same as the width of the wheel. Also, in the embodiment, the reinforcement portion 4 is formed integrally with the main body surface 3. The main body surface 3 includes three flat surfaces 31, and two reinforcement portions 4. Note that the numbers of flat surfaces 31 and reinforcement portions 4 are not limited to those above, and may be varied appropriately according to need. The flat surface 31 extends downward from the under cover 5, and has a flat surface substantially perpendicular to traveling air.

The reinforcement portion 4 is continuous with end parts of the flat surface 31 in the vehicle width direction, and is sandwiched between two flat surfaces 31. The reinforcement portion 4 includes a tilted surface portion 41 tilted with respect to the adjacent flat surfaces 31, and a pair of lateral surface portions 42 connecting the tilted surface portion 41 and the flat surfaces 31. The tilted surface portion 41 of the reinforcement portion 4 is tilted with respect to the flat surface 31, such that its lower end is substantially flush with the flat surface 31, and its upper end is separated farthest away from the flat surface 31 to the vehicle rear side. Accordingly, as shown in part (A) of FIG. 1, the main body surface 3 includes the reinforcement portions 4 connected to each of the three flat surfaces 31, and the reinforcement portion 4 protrudes to the vehicle rear side from the flat surface 31.

Also, the number of flat surfaces 31 corresponds to the number (three) of flat portions 22 of the attachment portion 2, and the corresponding parts are connected to each other. Note that in the embodiment, the number of reinforcement portions 4 corresponds to the number (two) of protrusions 21 of the attachment portion 2, and the corresponding parts are connected to each other, as an example. By being connected to the protrusion 21, the reinforcement portion 4 forms a recess having a reversed L shape in side view, on a surface of the resistance reduction member 1 on the vehicle front side (see part (E) of FIG. 4). In other words, the reinforcement portion 4, together with the flat surface 31, forms a bead shape protruding to the vehicle rear side, and has a strengthened form, for example. However, the invention is not limited to this, and in the aforementioned attachment portion 2 with no protrusions 21, the reinforcement portion 4 need not be connected with the attachment portion 2.

Furthermore, when the resistance reduction member 1 is attached to the lower surface of the vehicle body, the upper end part of the reinforcement portion 4 abuts on the under cover 5 (lower surface of vehicle body) (see parts (A) and (B) of FIG. 2). Hence, when the resistance reduction member 1 receives traveling air, the reinforcement portion 4 supporting the main body surface 3 keeps the main body surface 3 from toppling toward the vehicle rear.

In addition, the reinforcement portion 4 is tilted such that the tilted surface portion 41 comes closer to the flat surface 31 toward the lower side, from the side of the lower surface of the vehicle body. This allows force of load inputted to the resistance reduction member 1 from traveling air and the lock to be surely transmitted to the side of the lower surface of the vehicle body, so that warpage of the resistance reduction member 1 itself can be prevented, and sufficient aerodynamic performance and lock override performance can be achieved. Note that a flange portion 32 for guiding traveling air efficiently to the vehicle rear is connected smoothly toward the vehicle rear, on the periphery of the main body surface 3.

<Description of Operation>

Figure 5A:
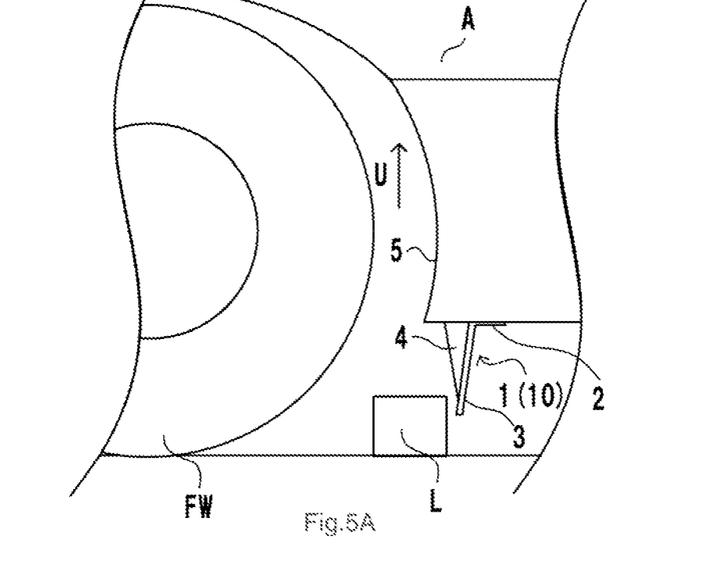
FIG. 5(A) is an explanatory drawing of the resistance reduction member having overridden a lock.

Referring to FIG. 5, an operation of the resistance reduction member 1 of the embodiment will be described. Part (A) of FIG. 5 shows a state where a vehicle A is parked from the front, and the resistance reduction member 1 has overridden the lock L provided in the parking area, as has been mentioned in the above description of the conventional technique. Note that when the resistance reduction member 1 overrides the lock L, a load inputted from the front of the main body surface 3 by the lock L causes the reinforcement portion 4 adjacent to the main body surface 3 to push the under cover 5 upward, in an arrow U direction in part (A) of FIG. 5. Since this allows both of the resistance reduction member 1 and the side of the lower surface of the vehicle body of the under cover 5 to warp, the resistance reduction member can override the lock L without being damaged.

Figure 5B:
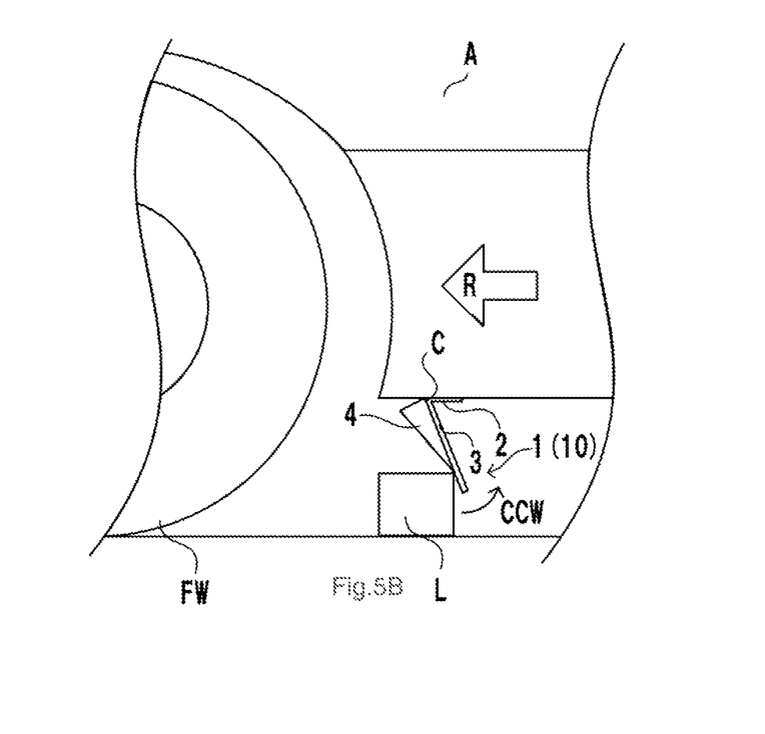
FIG. 5(B) is an explanatory drawing thereof when being drawn out of the lock.

Next, part (B) of FIG. 5 shows a state where the lock L abuts on the vehicle rear side of the resistance reduction member 1, when moving the vehicle A rearward (arrow R direction) and out of the parking area. At this time, a load inverted from that at the time of parking is applied on the resistance reduction member 1. Even when the load is applied on the resistance reduction member 1 from the lock L, the main body surface 3 and the reinforcement portion 4 rotate in a counterclockwise direction CCW around a rotation center C, which is a connection part between the attachment portion 2 and the main body surface 3. In the embodiment, the reinforcement portion 4 is not arranged on the vehicle front side as in the conventional technique shown in aforementioned FIG. 7. Hence, even if the load of the lock L acts on the main body surface 3, the reinforcement portion 4 does not resist against the load (no pulling direction force acts on the reinforcement portion 4), and therefore the resistance reduction member 1 can let the load pass. Moreover, warpage of the attachment portion 2 and the main body surface 3 prevents concentration of force in the attachment portion 2, so that the attachment portion 2 can be kept from falling off the under cover 5. Accordingly, even when drawing the resistance reduction member 1 out after it has overridden the lock L, warpage at the connection part between the main body surface 3 and the attachment portion 2 prevents damage in the resistance reduction member.

<Second Embodiment>

Figure 6:
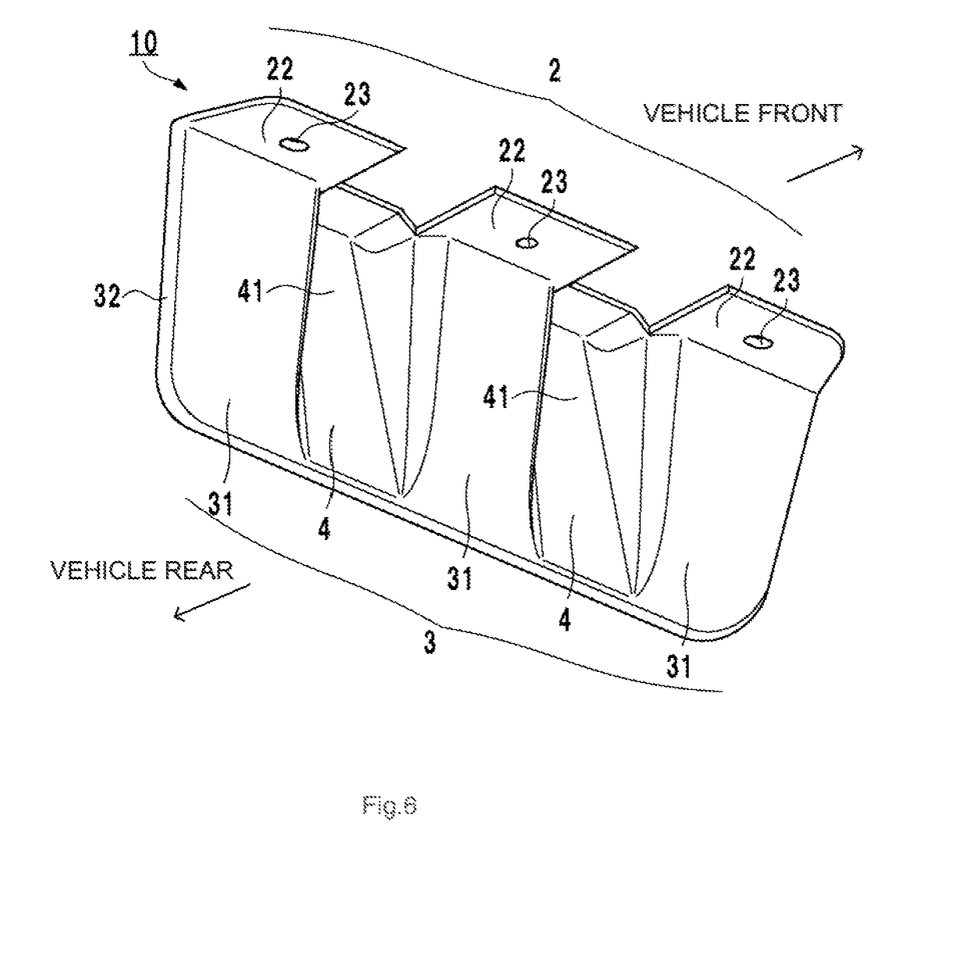
FIG. 6 is a perspective view of a resistance reduction member of a second embodiment.

FIG. 6 shows a resistance reduction member 10 of a second embodiment. The resistance reduction member 10 of the embodiment has a similar configuration to that of the resistance reduction member 1 shown in part (A) of FIG. 3, except that the protrusions 21 of the attachment portion 2 are excluded therefrom. Even though a reinforcement portion 4 is not connected with the protrusion 21, its upper end portion abuts on an under cover 5 (lower surface of vehicle body) when the resistance reduction member 10 is attached to a lower surface of the vehicle body. Hence, when the resistance reduction member 10 receives traveling air, the reinforcement portion 4 supporting a main body surface 3 keeps the main body surface 3 from toppling toward the vehicle rear. Also, the reinforcement portion 4 is tilted such that a tilted surface portion 41 comes closer to a flat surface 31 toward the lower side, from the side of the lower surface of the vehicle body. This allows load inputted to the resistance reduction member 10 from traveling air and the lock L to be surely transmitted to the side of the lower surface of the vehicle body, so that warpage of the resistance reduction member 10 itself can be prevented, and sufficient aerodynamic performance and lock override performance can be achieved. Note that a flange portion 32 for guiding traveling air efficiently to the vehicle rear is connected smoothly toward the vehicle rear, on the periphery of the main body surface 3. Also note that the shape of a lateral surface of the embodiment as viewed from the vehicle rear side is the same as that shown in aforementioned part (B) of FIG. 3.

Also in the embodiment, an upper end part of the reinforcement portion 4 may be cut out, to be flush with a flat portion 22 of an attachment portion 2. This allows the resistance reduction member 10 to be stably fixed to the lower surface of the vehicle body. In addition, when the resistance reduction member 10 of the embodiment is made of resin or other materials, for example, the reinforcement portion 4 may be manufactured as a solid part.

<Description of Operation>

Since connection between the reinforcement portion 4 and the attachment portion 2 is released by eliminating the protrusion 21 connected with the reinforcement portion 4, the main body surface 3 is more likely to warp with respect to the attachment portion 2. While the operation of the resistance reduction member 10 of the second embodiment is similar to that of the resistance reduction member 1 of the first embodiment shown in aforementioned FIG. 5, since the main body surface 3 is more likely to warp with respect to the attachment portion 2, the main body surface 3 rotates more smoothly in the counterclockwise direction around the attachment portion 2, as in part (B) of FIG. 5.

To be more specific, at the time of parking, when a vehicle A is parked from the front and the resistance reduction member 10 overrides a lock L provided in a parking area, they form a state as shown in part (A) of FIG. 5. Note that when the resistance reduction member 10 overrides the lock L, a load inputted from the front of the main body surface 3 by the lock L causes the reinforcement portion 4 adjacent to the main body surface 3 to push the under cover 5 upward, in an arrow U direction in part (A) of FIG. 5. Since this allows warpage of both the resistance reduction member 10 and the side of the lower surface of the vehicle body of the under cover 5, the resistance reduction member can override the lock L without being damaged.

Next, part (B) of FIG. 5 shows a state where the lock L abuts on the vehicle rear side of the resistance reduction member 10, when moving the vehicle A rearward (arrow R direction) and out of the parking area. At this time, a load inverted from that at the time of parking is applied on the resistance reduction member 10. Even when the load is applied on the resistance reduction member 10 from the lock L, the main body surface 3 and the reinforcement portion 4 rotate in a counterclockwise direction CCW around a rotation center C, which is a connection part between the attachment portion 2 and the main body surface 3. In the embodiment, the main body surface 3 is more likely to warp with respect to the attachment portion 2. Also, the reinforcement portion 4 is not arranged on the vehicle front side as in the conventional technique shown in aforementioned FIG. 7. Hence, even if the load of the lock L acts on the main body surface 3, the reinforcement portion 4 does not resist against the load (no pulling direction force acts on the reinforcement portion 4), and therefore the resistance reduction member 10 can let the load pass. Moreover, warpage of the attachment portion 2 and the main body surface 3 prevents concentration of force in the attachment portion 2, so that the attachment portion 2 can be kept from falling off the under cover 5. Accordingly, even when drawing the resistance reduction member 10 out after it has overridden the lock L, warpage at the connection part between the main body surface 3 and the attachment portion 2 prevents damage in the resistance reduction member.

Note that although in the configurations of the above embodiments the main body surface 3 extends substantially vertically from the under cover 5 in a slightly tilted manner, the invention is not limited to this. The main body surface may extend vertically from the under cover 5. Additionally, the reinforcement portion 4 is not limited to the bead shape mentioned above, and solid members such as a rib may be adopted. At this time, the main body surface 3 may be a plate-like member whose entire shape constitutes the flat surface 31, for example. Moreover, although the reinforcement portion 4 is formed such that it extends to the lower end part of the main body surface 3, it does not necessarily have to extend to the lower end part. The vertical length of the reinforcement portion 4 can be set appropriately, as long as sufficient strength is ensured to suppress deformation of the main body surface 3 due to traveling air. Furthermore, the reinforcement portion 4 may be configured such that its cross-sectional area in the horizontal direction gradually decreases toward the lower side, from the side of the lower surface of the vehicle body.

<Summary of Embodiment>

1. A resistance reduction member characterized by including: an attachment portion (such as 2) attached to a lower surface (such as 5) of a vehicle body; a main body surface (such as 3) extending downward from the attachment portion; and a reinforcement portion (such as 4) extending downward from the side of the lower surface of the vehicle body on the vehicle rear side of the main body surface, and configured to prevent toppling of the main body surface.

According to this configuration, since the reinforcement portion can ensure stiffness of the main body surface, deformation during travel can be suppressed, and aerodynamic performance can be maintained. When load of traveling air acts on the main body surface, the main body surface is less likely to topple since it is supported by the reinforcement portion. When an inverse load acts on the main body surface, the main body surface can topple and release the inverse load, since it is not supported by the reinforcement portion.

2. The resistance reduction member is characterized in that the reinforcement portion (such as 4) abuts on the lower surface (such as 5) of the vehicle body.

According to this configuration, even when load is inputted from the vehicle front side due to interference with a lock, for example, the connection part between the attachment portion and the reinforcement portion can suppress toppling of the main body surface, so that it is not severely deformed, and damage can be prevented.

3. The resistance reduction member is characterized in that the reinforcement portion (such as 4) is connected to the attachment portion (such as 2).

According to this configuration, since the attachment portion connected to the lower surface of the vehicle body is connected to the reinforcement portion, stiffness of the reinforcement portion is improved even more.

4. The resistance reduction member is characterized in that a cross-sectional area of the reinforcement portion (such as 4) in the horizontal direction gradually decreases toward the lower side, from the side of the lower surface of the vehicle body.

According to this configuration, stiffness of the main body surface can be varied in the vertical direction. Since stiffness is low around the lower end of the main body surface, damage in the main body surface caused by overriding of a lock or other objects can be prevented with higher accuracy.

5. The resistance reduction member is characterized in that the reinforcement portion (such as 4) has a bead shape protruding to the vehicle rear side.

According to this configuration, since the section stiffness of the bead-shaped part of the reinforcement portion (such as 4) is improved even more, deformation during travel is suppressed, and aerodynamic performance can be maintained.

6. The resistance reduction member is characterized in that the attachment portion (such as 2) has a locking portion (such as 23) locking onto the lower surface of the vehicle body, and the locking portion (such as 23) is arranged closer to the vehicle front side than the main body surface (such as 3).

According to this configuration, since the structure is configured to suppress deformation when load is inputted from the front, and rotate around a rotation center, which is a connection part between the attachment portion and the main body surface, to release load when load is inputted from the rear. Hence, damage in the resistance reduction member can be avoided. As a result, both reduction in air resistance and ease in drawing out of a lock when parking can be achieved.

7. The resistance reduction member is characterized in that the attachment portion (such as 2) has a bead shape that follows the shape of the reinforcement bead on the lower surface (such as 5) of the vehicle body.

According to this configuration, since the section stiffness of the attachment portion is improved even more by the bead shape, the resistance reduction member is not rattled by traveling air in an attachment part thereof with the vehicle body.

8. The resistance reduction member is characterized in that the reinforcement portion (such as 4) is connected with a protrusion (such as 21) of the bead shape of the attachment portion, and has a bead shape protruding to the vehicle rear side.

According to this configuration, stiffness of the resistance reduction member is improved, and mutual reinforcement of the resistance reduction member and the under cover suppresses deformation of the resistance reduction member. Hence, a sufficient air resistance reduction function can be achieved.

DESCRIPTION OF REFERENCE NUMERALS 1, 10, 20 resistance reduction member, 2 attachment portion, 3 main body surface, 4 reinforcement portion, 5 under cover

The invention claimed is:

1. An air-resistance reduction member to be installed in a vehicle, comprising:
   an attachment portion attached to a lower surface of a vehicle body in front of a tire of the vehicle;
   a main body extending downward from the attachment portion and forming a front surface to receive flowing air for reducing air-resistance acting against the tire; and
   a reinforcement portion provided to a rear side of the main body and extending downward from an upper position adjacent to said attachment portion and below said lower surface of the vehicle body in a direction along the rear side of the main body such that the reinforcement portion abuts on said lower surface of the vehicle body, thereby supporting the rear side of the main body against said lower surface of the vehicle body so as to prevent toppling of said main body,
   wherein said reinforcement portion is formed in a bead shape protruding to a vehicle rear.

2. The air-resistance reduction member according to claim 1, wherein said reinforcement portion is connected to said attachment portion at the upper position.

3. The air-resistance reduction member according to claim 1, wherein
   said reinforcement portion has a cross-sectional area in a horizontal direction which gradually decreases from the upper position toward a lower side thereof.

4. An air-resistance reduction member to be installed in a vehicle, comprising:
   an attachment portion attached to a lower surface of a vehicle body in front of a tire of the vehicle;
   a main body extending downward from the attachment portion and forming a front surface to receive flowing air for reducing air-resistance acting against the tire; and
   a reinforcement portion provided to a rear side of the main body and extending downward from an upper position adjacent to said attachment portion and below said lower surface of the vehicle body in a direction along the rear side of the main body such that the reinforcement portion abuts on said lower surface of the vehicle body, thereby supporting the rear side of the main body against said lower surface of the vehicle body so as to prevent toppling of said main body, wherein:
   said attachment portion has a locking portion configured to engage with said lower surface of the vehicle body; and
   the attachment portion is arranged at a vehicle front side of the air-resistance reduction member such that the locking portion is positioned in front of said main body.

5. An air-resistance reduction member to be installed in a vehicle, comprising:
   an attachment portion attached to a lower surface of a vehicle body in front of a tire of the vehicle;
   a main body extending downward from the attachment portion and forming a front surface to receive flowing air for reducing air-resistance acting against the tire; and
   a reinforcement portion provided to a rear side of the main body and extending downward from an upper position adjacent to said attachment portion and below said lower surface of the vehicle body in a direction along the rear side of the main body such that the reinforcement portion abuts on said lower surface of the vehicle body, thereby supporting the rear side of the main body against said lower surface of the vehicle body so as to prevent toppling of said main body, wherein
   said lower surface of the vehicle body has a reinforcement bead, and
   said attachment portion has a bead formed in a shape corresponding to a shape of the reinforcement bead of said lower surface of the vehicle body such that the bead of said attachment portion is fitted to the reinforcement bead of said lower surface of the vehicle body.

6. The air-resistance reduction member according to claim 5, wherein
   said bead of the attachment portion protrudes to a vehicle rear side, thereby forming a bead of the reinforcement portion at the upper position thereof.

* * * * *